US010138577B2

(12) United States Patent
Katsuta et al.

(10) Patent No.: US 10,138,577 B2
(45) Date of Patent: Nov. 27, 2018

(54) POLYPHENYLENE SULFIDE FIBERS, AND MANUFACTURING METHOD THEREFOR

(71) Applicant: Toray Industries, Inc., Tokyo (JP)

(72) Inventors: Hiroo Katsuta, Shizuoka (JP); Takaaki Mihara, Shiga (JP); Daisuke Yamamoto, Aichi (JP); Shunsuke Horiuchi, Aichi (JP); Yoshitsugu Funatsu, Shizuoka (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/315,042

(22) PCT Filed: May 22, 2015

(86) PCT No.: PCT/JP2015/064774
§ 371 (c)(1),
(2) Date: Nov. 30, 2016

(87) PCT Pub. No.: WO2015/182523
PCT Pub. Date: Dec. 3, 2015

(65) Prior Publication Data
US 2017/0198414 A1  Jul. 13, 2017

(30) Foreign Application Priority Data

May 30, 2014  (JP) .................................. 2014-112124
Aug. 29, 2014  (JP) .................................. 2014-175074

(51) Int. Cl.
*C08G 75/00* (2006.01)
*D01F 6/76* (2006.01)
*C08G 75/0213* (2016.01)
*C08G 75/0254* (2016.01)
*C08G 75/0277* (2016.01)
*D01D 5/08* (2006.01)
*D02J 1/22* (2006.01)
*D01D 10/02* (2006.01)
*D01F 6/94* (2006.01)

(52) U.S. Cl.
CPC ......... *D01F 6/765* (2013.01); *C08G 75/0213* (2013.01); *C08G 75/0254* (2013.01); *C08G 75/0277* (2013.01); *D01D 5/08* (2013.01); *D01D 10/02* (2013.01); *D01F 6/94* (2013.01); *D02J 1/224* (2013.01)

(58) Field of Classification Search
CPC .. C08G 75/14; C08G 75/025; C08G 75/0281; C08F 6/28

USPC ......................................................... 528/388
See application file for complete search history.

(56) References Cited

U.S. PATENT DOCUMENTS

| 5,178,813 A | 1/1993 | Akatsu et al. |
| 5,405,695 A | 4/1995 | Akatsu et al. |

FOREIGN PATENT DOCUMENTS

| JP | 04-100915 A | 4/1992 | |
| JP | 4-222217 A | 8/1992 | |
| JP | 04-370218 A | 12/1992 | |
| JP | 2000-178829 A | 6/2000 | |
| JP | 2004-263332 A | 9/2004 | |
| JP | 2007-169854 A | 7/2007 | |
| JP | 2008-202164 * | 9/2008 | ............... D01F 6/76 |
| JP | 2008-202164 A | 9/2008 | |
| JP | 2008-231140 A | 10/2008 | |
| JP | 2009-215680 A | 9/2009 | |
| JP | 2010-196187 A | 9/2010 | |
| JP | 2011-074539 A | 4/2011 | |
| JP | 2014-025166 A | 2/2014 | |

OTHER PUBLICATIONS

Aranishi et al. (Derwent 2007-539492), Jul. 2007.*
Kanomata (Derwin 2009-N95772), Sep. 2009.*
Supplementary European Search Report dated Dec. 5, 2017, of corresponding European Application No. 15799260.3.
Office Action dated Mar. 9, 2018, of corresponding Chinese Application No. 201580028893.3, along with an English translation.
Office Action dated Mar. 29, 2018, of corresponding Australian Application No. 2015267804.
Office Action dated Aug. 14, 2018, of counterpart Taiwanese Application No. 104117479, along with an English translation.

* cited by examiner

Primary Examiner — Shane Fang
(74) Attorney, Agent, or Firm — DLA Piper LLP (US)

(57) ABSTRACT

A poly(phenylene sulfide) fiber contains 1-10% by weight of a poly(phenylene sulfide) oligomer having a weight-average molecular weight of 5,000 or less, has a difference between a cold crystallization heat quantity ($\Delta Hc$) and a crystal melting heat quantity ($\Delta Hm$) during temperature rising in DSC, $\Delta Hm-\Delta Hc$, of 25 J/g or larger, and has an elongation of less than 40% and a strength of 3.0 cN/dtex or higher. The poly(phenylene sulfide) fiber has high heat resistance and chemical resistance and high strength and, despite this, has excellent suitability for high-order processing, e.g., thermal shapability, because the amorphous parts thereof have high molecular movability.

2 Claims, No Drawings

POLYPHENYLENE SULFIDE FIBERS, AND MANUFACTURING METHOD THEREFOR

TECHNICAL FIELD

This disclosure relates to a poly(phenylene sulfide) fiber having high heat resistance and chemical resistance and having high strength and, despite this, has excellent suitability for high-order processing, e.g., thermal shapability, because the amorphous parts thereof have high molecular movability.

BACKGROUND

Poly(phenylene sulfide) (hereinafter often abbreviated to "PPS") fibers have high heat resistance, chemical resistance, electrical insulating properties, and flame retardancy and have hence come to be used in industrial material applications including various filters, electrical insulators, and papermaking canvases. In particular, PPS fibers are extensively used in filter cloths for use in various industrial filters, e.g., bag filters for dust collection from discharge gases.

In the industrial material applications including such filter cloths, the PPS fibers are desired to have excellent mechanical properties. For example, PPS short fibers having high strength, an elongation as measured under 1.0 dN/dtex tensile load of 10% or less, and a degree of crimp of 12% or higher (JP-A-2004-263332) and a technique of heightening tensile strength, knot strength, and loop strength by melt-spinning PPS, subsequently stretching the spun filaments 2-7 times at a temperature not higher than the melting point of the PPS, and then heat-treating the filaments at a temperature not lower than the melting point of the PPS (JP-A-4-222217) have been disclosed.

Furthermore, PPS fibers constituted of a resin composition obtained by adding 0.1-10% by weight of aromatic hyperbranched polymer to PPS having a weight-average molecular weight of 70,000 or higher and a process of producing the PPS fibers (JP-A-2010-196187) have been disclosed. There is a statement therein to the effect that when that technique is applied, flowability of high-molecular-weight PPS is improved and the PPS is hence rendered spinnable, making it possible to obtain fibers having high strength.

Meanwhile, with respect to techniques of forming fibers of an oligomer-containing PPS resin, the following have been disclosed: a process of producing PPS fibers in which a PPS resin containing an oligomer having a dispersity ratio, represented by (weight-average molecular weight)/(number-average molecular weight), of 10 or less and a weight-average molecular weight of 1,000 or less, in an amount of 5% or less in terms of weight content is directly spun at a high speed of 3,000 m/min or higher and stretched, for the purposes of improving production efficiency and inhibiting filament breakage during spinning (JP-A-4-370218); and a process of producing PPS fibers in which a PPS resin is melted and subsequently spun through a spinneret and the spun filaments are taken up at a speed of 1,000-1,500 m/min, subsequently stretched with heating without being temporarily wound up, and then subjected to a heat treatment for relaxation at a temperature of 160-240° C. (JP-A-2000-178829).

Furthermore, PPS fibers having a dispersity ratio of 2.5 or less and an alkali metal content of 50 ppm or less and a process for producing the PPS fibers have been disclosed for the purpose of diminishing gas evolution during fiber formation steps (JP-A-2008-202164).

Moreover, a process of producing PPS fibers by a direct-spinning/stretching method and the PPS fibers have been disclosed (JP-A-2009-215680), the process being characterized in that unstretched filaments are taken up at 500-1,000 m/min, subjected to pre-stretching in a ratio of 1.03-1.09 between the take-up roll and a feed roll having a temperature of 80-100° C., stretched under specific stretching conditions, and then subjected to a constant-length treatment and a heat treatment for relaxation.

Furthermore, a process of producing PPS fibers containing impurities such as an oligomer, but have excellent production stability has been disclosed, the process being characterized by performing core/sheath composite spinning to produce PPS fibers in which the core component thereof is constituted of flash-process PPS and the sheath component thereof is constituted of quench-process PPS (JP-A-2014-25166).

However, when the techniques of JP '332 and JP '217 are applied, there has been a problem in that although strength enhancement can be attained, the PPS fibers have reduced thermal shapability due to an increase in the degree of crystallization, resulting in impaired crimpability.

The technique of JP '187 has had a problem in that the technique leads to an increase in cost and a decrease in spinnability.

When the techniques of JP '218 and JP '829 are applied, there has been a problem in that as the oligomer content increases, the process stability practically becomes worse due to the influence of the oligomers and filament breakage becomes prone to occur in the spinning and stretching steps. In addition, the fibers thus obtained tend to have considerable fluffs and impaired suitability for high-order processing.

When the technique of JP '164 is applied, there has been a problem in that although gas evolution during the fiber formation step is reduced, the fibers obtained have low strength.

When the technique of JP '680 is applied, there has been a problem in that although strength enhancement can be attained, the PPS fibers have reduced thermal shapability due to an increase in the degree of crystallization, resulting in impaired crimpability.

When the technique of JP '166 is applied, an improvement in production stability is attained as compared to when flash-process PPS is used alone, but there has been a problem in that the PPS fibers have reduced strength due to the influence of impurities, etc. as compared with the quench-process PPS alone.

It could therefore be helpful to provide a PPS fiber having high heat resistance and chemical resistance and having high strength and, despite this, has excellent suitability for high-order processing, e.g., thermal shapability because the amorphous parts thereof have high molecular movability.

SUMMARY

We thus provide:

a PPS fiber containing 1-10% by weight of a poly(phenylene sulfide) oligomer having a weight-average molecular weight of 5,000 or less, having a difference between a cold crystallization heat quantity ($\Delta Hc$) and a crystal melting heat quantity ($\Delta Hm$) during temperature rising in DSC, $\Delta Hm - \Delta Hc$, of 25 J/g or larger, and having an elongation of less than 40% and a strength of 3.0 cN/dtex or higher.

Additionally, a process of producing a poly(phenylene sulfide) fiber has the following configuration, namely:

a process of producing a poly(phenylene sulfide) fiber, the process including: melt-spinning a poly(phenylene sulfide) resin which contains 1-10% by weight of a poly(phenylene sulfide) oligomer having a weight-average molecular weight of 5,000 or less; taking up the resultant spun filament at a take-up speed of 500-1,500 m/min, followed by subjecting stretching and a heat treatment in a total stretch ratio of 3.5 or higher.

It is preferable that the poly(phenylene sulfide) oligomer is a cyclic oligomer.

It is preferable that the filament ejected through a spinneret hole is collected in a position located at a distance of 500-7,000 mm from a position where cooling is initiated.

It is preferable that the heat treatment is performed using either a roller heated to 160-250° C. or a group of the rollers.

It is thus possible to provide a PPS fiber having high heat resistance and chemical resistance and having high strength and, despite this, has excellent suitability for high-order processing, e.g., thermal shapability, because the amorphous parts thereof have high molecular movability.

DETAILED DESCRIPTION

Our PPS fiber is explained below in detail.

The PPS is a polymer including phenylene sulfide units such as p-phenylene sulfide units which are represented by structural formula (1), and m-phenylene sulfide units, as the main repeating units.

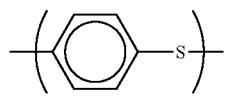

(1)

From the standpoint of heat resistance, the PPS preferably is a polymer which includes the repeating units represented by structural formula (1) in an amount of 70% by mole or larger, desirably 90% by mole or larger.

The PPS fiber has a weight-average molecular weight of preferably 20,000 or higher, more preferably 25,000 or higher, even more preferably 30,000 or higher. By regulating the weight-average molecular weight thereof to 20,000 or higher, spinnability during melt spinning can be ensured and the mechanical properties including strength and elastic modulus, heat resistance, and chemical resistance are rendered satisfactory. An upper limit of the weight-average molecular weight thereof is preferably less than 200,000, more preferably less than 150,000, even more preferably less than 120,000, from the standpoint of obtaining a melt viscosity suitable for spinning. The weight-average molecular weight can be calculated in terms of polystyrene, for example, by the method described in the Examples which will be given later.

The PPS fiber contains a PPS oligomer having a weight-average molecular weight of 5,000 or less, in an amount of 1-10% by weight. As described above with regard to the conventional techniques, it is well known that oligomers are contained in PPS polymers and it is known that fiber breakage during spinning and stretching comes to occur more frequently as the oligomer content increases. However, as a result of our investigations on the functions of oligomers, we discovered that by causing a PPS oligomer to be present in PPS fiber, the molecular movability of the amorphous parts can be improved. The fact that PPS oligomers have an effect of enhancing plasticization of PPS melts is seen from the phenomenon that the addition of a PPS oligomer to a PPS resin makes the PPS resin have a reduced melt viscosity and better flowability. An important point is that the presence of the PPS oligomers can serve only to enhance movability of the amorphous parts of the solid-state fibers. Although the mechanism of this has not been fully elucidated, we believe that the PPS oligomers are less apt to be incorporated into the crystalline parts during orientation and crystallization of the PPS fibers and is mostly present in the amorphous parts and that because of this, the PPS oligomers, even when contained in a small amount, can enhance the movability of the amorphous parts. Consequently, in fibers in which the polymer has been highly oriented and is in a highly crystallized state, the PPS oligomers' effect of improving the movability of the amorphous parts is remarkably exhibited. This function is clearly observed as a decrease in the peak temperature of loss tangent (tan δ) which will be described later.

The oligomer contained in the resin is a PPS oligomer made up of the same repeating units as the PPS polymer. Because of this, the oligomer neither inhibit the orientation/crystallization characteristics of the whole resin nor impair the mechanical properties or chemical resistance. Furthermore, since the oligomer contained is a PPS oligomer, the oligomer exerts little influence as foreign matter and, hence, the suitability for fiber formation in spinning and stretching is not impaired excessively and the fibers have little fluffing and have excellent evenness in fiber diameter. However, as stated in JP '218 and JP '829, in cases when high-speed spinning at a spinning speed of 3,000 m/min or higher or high-ratio stretching for strength enhancement is performed, fiber breakage and fluffing become more prone to occur as the content of PPS oligomer increases. It is therefore preferable, when obtaining our fibers, that spinning should be conducted at a low spinning speed and stretching be conducted in multiple stages and that a low stretching temperature and a high heat setting temperature be used, as will be described later.

The PPS oligomer substantially is a polymerized compound having a degree of polymerization of 3 or higher, and does not contain low-boiling-point substances such as monomer or dimer.

The amount of low-boiling-point substances contained in the PPS fiber is preferably 0.3% by weight or less, more preferably 0.2% by weight or less, even more preferably 0.1% by weight or less. When the content of low-boiling-point substances exceeds 0.3% by weight, spinneret fouling occurs in the spinning step, resulting in considerably impaired suitability for fiber formation. The content of low-boiling-point substances can be determined in terms of weight loss ratio through a 2-hour treatment at 320° C.

It is preferable that the PPS oligomer is a cyclic oligomer. When the PPS oligomer in the PPS fiber is a cyclic oligomer, this PPS oligomer has no terminal group and, hence, is less apt to undergo chemical reactions, e.g., a crosslinking reaction, and to undergo a structural change. Consequently, the fiber is excellent in terms of heat resistance and chemical resistance. The higher the proportion of the cyclic oligomer in the PPS oligomer, the more the fiber is preferred. The proportion thereof is preferably 70% by weight or higher, more preferably 80% by weight or higher.

The PPS cyclic oligomer is represented by structural formula (2), in which m is an integer of 4-20, and may be a mixture of two or more of 4-20.

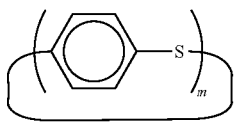

(2)

The PPS cyclic oligomer may be either a single compound in which the molecules are equal in the number of repetitions or a mixture of PPS cyclic oligomer compounds differing in the number of repetitions. However, a mixture of PPS cyclic oligomer compounds differing in the number of repetitions is preferred because this mixture tends to have a lower melting temperature than single compounds in each of which the molecules are equal in the number of repetitions.

The lower limit of the amount of the PPS oligomer contained in the PPS fiber is 1% by weight or larger, preferably 1.2% by weight or larger, more preferably 1.5% by weight or larger, especially preferably 2.0% by weight or larger. When the content of the PPS oligomer is less than 1% by weight, the amorphous parts within the PPS fiber show reduced molecular movability, resulting in poor heat setting properties represented by thermal shapability. The upper limit of the content of the PPS oligomer is 10% by weight or less, preferably 8% by weight or less. When the content of the PPS oligomer exceeds 10% by weight, the mechanical properties decrease.

The content of the PPS oligomer and PPS cyclic oligomer in the PPS fiber can be determined, for example, by using high performance liquid chromatography (HPLC) by the method described in the Examples.

The alkali metal content of the PPS fiber is preferably 500 ppm or less, more preferably 100 ppm or less, even more preferably 50 ppm or less. When the alkali metal content thereof is 500 ppm or less, fiber breakage during spinning tends to be inhibited and improved reliability is attained in applications where electrical insulating properties are required. The term "alkali metal content of PPS fiber" means a value calculated from the amount of alkali metals contained in an ash obtained as a residue when the PPS fibers are burned, for example, in an electric furnace. By analyzing the ash by ion chromatography or atomic absorption spectrometry, the alkali metal content can be determined.

It is preferable that the PPS fiber contain substantially no halogen other than chlorine. When the PPS fiber contains chlorine as a halogen, the chlorine is stable in temperature ranges where the PPS fiber is usually used. Consequently, inclusion of a small amount of chlorine exerts little influence on the mechanical properties. However, when the PPS fiber contains halogens other than chlorine, the peculiar properties of these halogens tend to reduce the mechanical properties of the PPS fiber. When the PPS fiber contains chlorine as a halogen, the content thereof is preferably 1.0% by weight or less, more preferably 0.5% by weight or less, even more preferably 0.2% by weight or less. When chlorine is contained in the PPS fiber in an amount of 1% by weight or less, the chlorine exerts little influence on the suitability for fiber formation or on the mechanical properties. Such a chlorine content is hence suitable.

The PPS fiber has a difference between a cold crystallization heat quantity ($\Delta Hc$) and a crystal melting heat quantity ($\Delta Hm$) during temperature rising in DSC, $\Delta Hm-\Delta Hc$, of 25 J/g or larger. The temperature at which an exothermic peak is observed is taken as crystallization temperature (Tc), and the crystallization heat quantity at the Tc is expressed by $\Delta Hc$ (J/g). Meanwhile, the temperature which is not lower than 200° C. and at which an endothermic peak is observed is taken as melting point (Tm), and the melting heat quantity at the Tm is expressed by $\Delta Hm$ (J/g). The value of $\Delta Hm-\Delta Hc$ during temperature rising in DSC indicates the degree of crystallization of fiber; and the larger the value of $\Delta Hm-\Delta Hc$, the higher the degree of crystallization of the PPS fiber. When $\Delta Hm-\Delta Hc$ is less than 25 J/g, the fiber has a low degree of crystallization, i.e., contains a large amount of amorphous parts. Consequently, when such a fiber is held at a high temperature of about 150° C., molecular movement in the amorphous parts is enhanced and a structural change due to heat (thermal deterioration) is apt to proceed. This poses a practical problem in that the fiber decreases in strength when used at high temperatures. Meanwhile, when $\Delta Hm-\Delta Hc$ is 25 J/g or larger, the fiber has a reduced proportion of amorphous parts, in which molecular movement is enhanced during high-temperature holding, and the crystalline parts scatteringly present therein inhibit the molecular movement within the surrounding amorphous parts. Consequently, the progress of thermal deterioration is retarded, and the fiber has excellent heat resistance. The $\Delta Hm-\Delta Hc$ of the PPS fiber is preferably 28 J/g or larger, more preferably 30 J/g or larger. Although there is no particular upper limit on the $\Delta Hm-\Delta Hc$, an industrially attainable upper limit thereof is about 50 J/g.

The birefringence ($\Delta n$) of the PPS fiber is preferably 0.20 or higher, more preferably 0.22 or higher, even more preferably 0.24 or higher. The larger the value of $\Delta n$, the higher the degree to which the molecular chains have been oriented in the fiber axis direction. So long as $\Delta n$ is 0.20 or larger, the degree of molecular orientation in the fiber axis direction is sufficiently high and the fiber has high strength and high elastic modulus. Although there is no particular upper limit on $\Delta n$, an industrially attainable upper limit thereof is about 0.30.

The single-fiber fineness of the PPS fiber is preferably 5.0 dtex or less, more preferably 4.0 dtex or less, even more preferably 3.0 dtex or less. By regulating the single-fiber fineness thereof to 5.0 dtex or less, the fiber is rendered flexible. Although there is no particular upper limit on the single-fiber fineness, an attainable upper limit thereof is about 0.5 dtex.

Elongation of the PPS fiber is less than 40%, more preferably 35% or less. When the elongation thereof is 40% or higher, the molecular chains have not been sufficiently oriented in the fiber axis direction and the fiber is prone to suffer a plastic deformation during practical use. A lower limit of the elongation thereof is preferably 10% or higher, more preferably 15% or higher, from the standpoint of ensuring satisfactory handleability and processability.

The strength of the PPS fiber is 3.0 cN/dtex or higher, more preferably 3.3 cN/dtex or higher, even more preferably 3.5 cN/dtex or higher. When the strength thereof is less than 3.0 cN/dtex, fiber breakage due to external force is apt to occur during use and the PPS fiber is difficult to use, for example, under high tension. Although there is no particular upper limit on the strength thereof, an attainable upper limit thereof is about 6.0 cN/dtex.

It is preferable that the PPS fiber has a peak temperature of loss tangent (tan δ) of 120-150° C. So long as the peak temperature thereof is within this range, the fiber has satisfactory heat resistance and excellent thermal shapability. The term "peak temperature of tan δ" is a value determined by the method described in the Examples.

tan δ is a ratio between loss modulus and storage modulus. Large values thereof mean that the ratio of dissipated heat to imposed energy is high. In synthetic fibers, the temperature dependence of tan δ has a peak, and the peak temperature, which is a temperature at which movement in the amorphous parts comes to be enhanced, is thought to have the same meaning as glass transition temperature.

The degree of 160° C. dry heat shrinkage of the PPS fiber is preferably 8.0% or less, more preferably 6.0% or less. The lower the degree of 160° C. dry heat shrinkage, the higher the thermal dimensional stability. Such a fiber is suitable for applications where the fiber is used in high-temperature atmospheres. Although there is no particular lower limit on the degree of 160° C. dry heat shrinkage, an attainable lower limit thereof is about 0.5%.

The fiber is characterized in that it has high strength and high elongation because the PPS is in a highly oriented and highly crystallized state and that, despite this, the amorphous parts thereof have high movability since the PPS contains a PPS oligomer. In conventional PPS fibers in which the PPS has been highly oriented and highly crystallized, the amorphous parts also have reduced movability as a matter of course. Due to the inclusion of the PPS oligomer, the movability of the amorphous parts only is enhanced without adversely affecting the overall orientation and crystallization. Since the inclusion of the PPS oligomer enhances the movability, fiber breakage during spinning and stretching tends to occur. It is therefore preferable that spinning is conducted at a low spinning speed and stretching is conducted in multiple stages and that a low stretching temperature and a high heat setting temperature are used.

Next, the process of producing our PPS fiber is explained in detail.

Examples of methods of producing the PPS polymer include: (1) a method in which an alkali metal sulfide such as sodium sulfide is reacted with a polyhalogenated aromatic compound such as p-dichlorobenzene in an organic amide solvent such as N-methyl-2-pyrrolidone (hereinafter often abbreviated to "NMP") to obtain a PPS polymer; (2) a method in which an alkali metal sulfide such as sodium sulfide and a polyhalogenated aromatic compound such as p-dichlorobenzene are heated and polymerized in an organic amide solvent such as NMP and then cooled to 220° C. or lower to obtain a liquid reaction mixture at least including a mixture of granular PPS and other PPS, the organic polar solvent, water, and an alkali metal halide, and the granular PPS is removed from the liquid reaction mixture to obtain a recovered slurry, from which the PPS polymer is obtained; and (3) a method in which a PPS cyclic oligomer is melted and heated to obtain a PPS polymer, as described in JP-A-2008-202164.

Examples of methods of adding a PPS oligomer in the process of producing our fibers include a method in which a desired amount of a PPS oligomer is incorporated into a PPS polymer obtained by any of the methods described above, by kneading with a twin-screw kneader or the like. In using method (3) described above, use can be made of a method in which the polymerization reaction is terminated at the time when the amount of PPS oligomer including the PPS cyclic oligomer has become the desired amount.

Various properties of the PPS polymer to be used in the process, including the weight-average molecular weight of the polymer and properties of the PPS oligomer to be incorporated into the PPS polymer, are as described above with regard to our PPS fiber.

The PPS polymer composition thus obtained can be used to produce a fiber by a melt spinning method.

In the production process, it is preferable that the PPS polymer is dried before being subjected to melt spinning, from the standpoints of inhibiting foaming due to water inclusion and thereby enhancing suitability for fiber formation. It is more preferred to conduct vacuum drying, because the low-boiling-point monomers remaining in the PPS polymer can also be removed to thereby further heighten the suitability for fiber formation. With respect to drying conditions, vacuum drying is usually performed at 100-200° C. for 8-24 hours.

A known melt spinning technique using a spinning machine of the pressure melter type, single- or twin-screw extruder type or the like can be applied to the melt spinning. However, it is preferred to use an extruder type extrusion machine from the standpoint of reducing residence time. The polymer extruded is passed through a pipeline, metered with a known metering device, e.g., a gear pump, passed through a filter for foreign-matter removal, and then led to a spinneret. In this operation, the temperature of the parts ranging from the polymer pipeline to the spinneret (spinning temperature) is preferably regulated to or above the melting point of the PPS to enhance the flowability, and is more preferably not lower than (meting point of the PPS)+10° C. However, too high spinning temperatures lead to thermal deterioration of the PPS, resulting in the evolution of decomposition gas and impaired suitability for fiber formation. The spinning temperature hence is regulated to preferably 400° C. or lower, more preferably 380° C. or lower. It is possible to independently regulate the temperatures of the parts ranging from the polymer pipeline to the spinneret. In this case, ejection is stabilized by regulating the temperature of a portion near the spinneret to be higher than the temperature of the portion(s) located upstream therefrom.

The spinneret to be used for the ejection preferably is one in which the hole diameter D of the spinneret holes is 0.10-0.40 mm and an L/D, which is defined as the quotient obtained by dividing the land length L of the spinneret holes (the length of each straight portion having the same diameter as the spinneret hole) by the hole diameter, of 1.0-4.0. The number of holes per one spinneret is preferably 20 or larger from the standpoint of production efficiency.

The filaments ejected through the spinneret holes must be cooled with a gas or liquid and solidified. As the gas, use can be made of any desired gas such as air or a mixed gas including nitrogen, oxygen, and water vapor. However, air is preferred from the standpoint of handleability. The temperature of the cooling gas may be determined in view of a balance between the temperature thereof and cooling wind velocity, from the standpoint of cooling efficiency. However, the temperature of the cooling gas is preferably 50° C. or lower from the standpoint of evenness in fineness. The cooling gas is caused to flow approximately perpendicularly to the filaments to thereby cool the filaments. In this cooling, the velocity of the cooling wind is preferably 5 m/min or higher from the standpoints of cooling efficiency and evenness in fineness, and is preferably 50 m/min or less from the standpoint of stable fiber formation. It is also preferable that the cooling for solidification is initiated in a position located at a distance of 20-500 mm from the spinneret. When the cooling is initiated at a distance less than 20 mm, the spinneret surface temperature may decline and the ejection becomes unstable. When the cooling is not initiated within 500 mm, stability of refinement behavior may not be maintained and stable spinning is impossible. Meanwhile, as the liquid, use can be made of any desired liquid such as water, an alcohol, or an organic solvent. However, water is preferred from the standpoint of handleability.

It is preferable that the filaments ejected through the spinneret holes is collected in a position located at a distance of 500-7,000 mm from the position where the cooling is initiated. When the distance from the cooling initiation position to the position for collection is 500 mm or longer, the filaments are not collected before solidification. Thus, it is possible to prevent property decreases due to fusion between single fibers or to prevent enhanced unevenness in fiber diameter due to unstable solidification points. When the filaments are collected within 7,000 mm, a moderate spinning tension is obtained and filament breakage is less apt to occur, resulting in improved spinning stability.

In particular, the PPS resin shows high molecular movability when in a molten state, because the resin contains a PPS oligomer, and melt spinning thereof tends to result in a prolonged distance from the cooling initiation position to the solidification position. Consequently, the position for collection is preferably 500 mm or longer, more preferably 800 mm or longer, even more preferably 1,000 mm or longer, in terms of distance from the cooling initiation position. Meanwhile, from the standpoint of preventing filament breakage due to an increase in spinning tension and thereby improving the spinning stability, the position for collection is preferably 7,000 mm or less, more preferably 6,000 mm or less, even more preferably 5,000 mm or less, in terms of distance from the cooling initiation position.

The filaments that have been cooled and solidified are taken up by a roller (godet roller) rotating at a constant speed.

In the process for PPS fiber production, the PPS resin exhibits enhanced molecular movability because of the PPS oligomer contained therein, and filament breakage in the melt spinning tends to come to occur more frequently as the take up speed is increased. Consequently, the take-up speed is 1,500 m/min or less, preferably 1,200 m/min or less, more preferably 1,000 m/min or less. When the take-up speed exceeds 1,500 m/min, filament breakage and fluffing occur.

Meanwhile, the lower limit of the take-up speed is 500 m/min or higher, more preferably 600 m/min or higher, from the standpoints of evenness in fiber diameter and production efficiency. When the take-up speed is less than 500 m/min, not only poor production efficiency results but also enhanced unevenness in fiber diameter tends to result because the spinning tension is so low that the filaments swing.

It is preferable that the unstretched filament thus obtained is stretched with heating between a first roller and a second roller, either after being temporarily wound up or successively after being taken up. Specifically, the unstretched filament is heated to a predetermined temperature by a heating device disposed in or at the first roller or between the first roller and the second roller, and conditions are set so that the filament is stretched in the vicinity of the heat source in accordance with the peripheral-speed ratio between the first roller and the second roller. Stretching the filament in this manner is important from the standpoint of processability. These rollers are each equipped with a separate roller so that the fiber is heated while running along the peripheries of the rollers at a fixed steed. From the standpoints of stabilizing the heating temperature and fixing the speed, it is preferable that the fiber makes about four laps around each roller. An upper limit of the number of laps is about 10 from the standpoint of the production efficiency of the equipment.

When the first roller is used as a heat source, a separate roller may be provided to the roller so that the fiber is heated while running along the peripheries of the rollers at a fixed speed. In this case, from the standpoints of stabilizing the heating temperature and fixing the speed, it is preferable that the fiber makes about six laps around each roller. An upper limit of the number of laps is about 10 from the standpoint of the production efficiency of the equipment. From the standpoint of processability, it is important to set conditions so that the fiber is stretched in the vicinity of the outlet of the first roller.

When a heating device disposed between the first roller and the second roller is used as a heat source, the heating device may be of the contact type or the non-contact type. Specific usable methods include hot pins, hot plates, a liquid bath, a laser, infrared rays, heated water vapor or the like. It is preferred to use a liquid bath, from the standpoints of handleability and thermal efficiency. In using a liquid bath, the liquid to be used can be any desired liquid such as water, an alcohol, or an organic solvent, but water is preferred from the standpoint of handleability. From the standpoint of processability, it is important to set conditions so that the fiber is stretched in the vicinity of the inlet of the liquid bath.

The temperature of the heat source in the stretching step is preferably 70-130° C. By regulating the temperature thereof to 70° C. or higher, the processability is improved and stable stretching is rendered possible. By regulating the temperature thereof to 130° C. or lower, fluffing and filament breakage can be inhibited and a fiber having excellent quality can be obtained.

The second roller may be heated or not at will. In heating the second roller, it is preferred to regulate the temperature thereof to 130° C. or lower, from the standpoint of processability. When the temperature of the second roller exceeds 130° C., there is a heightened possibility that the filament might be stretched on the second roller, resulting in considerably reduced processability. In particular, since the PPS resin exhibits high molecular movability because of the PPS oligomer contained therein and the stretching of filament thereof performed at an elevated stretching temperature tends to result in filament breakage, lower temperatures are suitable for the second roller.

It is preferable that the filament which has passed the second roller is heat-treated by heating the filament with a heated third roller or a group of heated third rollers or with a heating device disposed between the second roller and the third roller(s). The heating device may be of the contact type or the non-contact type, and specific usable methods include hot pins, hot plates, a liquid bath, a laser, infrared rays, heated water vapor or the like. As the heat source for the heat treatment, it is preferred to use a heated third roller or a group of heat third rollers, from the standpoints of the heating temperature and heating time which will be described later.

The heat treatment in the process is a method of improving the degree of crystallization of fiber. By giving the heat treatment to fiber, mechanical properties including strength are improved and the degree of shrinkage is reduced. The heat treatment hence is important to obtain fiber that can withstand practical use. The temperature of the heating roller(s) as a method for giving the heat treatment is preferably 160° C. or higher, more preferably 180° C. or higher. Meanwhile, the temperature of the heating roller(s) is preferably 250° C. or lower, because temperatures thereof close to the melting point of the fiber result in fusion breakage. With respect to heating time, too short heating times do not enable the crystallization to proceed sufficiently. Consequently, the heating time is preferably 0.1 second or longer, more preferably 0.3 seconds or longer. Although there is no particular upper limit on the heating time, it is preferable that the heating time is preferably 1,000 seconds or shorter from the standpoint of production efficiency. The stretch ratio in the stretching with the first roller and the second roller is preferably set so that the value determined by the following expression is in the range of 0.6-1.0. By setting the stretch ratio so that the value is 0.6 or larger, fiber having excellent mechanical properties can be obtained. By setting the stretch ratio so that the value is 1.0 or smaller, filament breakage during the stretching is made less apt to occur and the process stability is improved. With respect to specific values of stretch ratio, 3.0-6.0 is preferred and 3.5-5.0 is more preferred.

(Stretch ratio)/[100+(elongation of unstretched filament (%))]×100

Furthermore, the stretch ratio expressed by the peripheral-speed ratio between the second roller and the third roller(s) can be regulated at will so long as the fiber does not break. However, especially in fiber containing a PPS oligomer, it is important to take care not to heighten the tension since such a fiber shows high molecular movability and tends to suffer filament breakage under high tension. Consequently, low stretch ratios are suitable for stretching between the second roller and the third roller(s), and the stretch ratio is preferably set at 0.9-1.0, more preferably 0.9-1.0.

The total stretch ratio in the process is 3.5 or higher, preferably 3.7 or higher. When the total stretch ratio is less than 3.5, fiber having excellent mechanical properties cannot be produced. Although there is no particular upper limit on the total stretch ratio, an attainable upper limit thereof is about 5.0. The total stretch ratio in the process is defined as the ratio of the peripheral speed of the last roller to the speed of feeding the unstretched fiber to be stretched, i.e., the peripheral speed of the first roller used for stretching. The last roller is the final roller that governs the speed of filament in the stretching and heat treatment steps. Since stretching and a heat treatment are generally performed successively, that last roller is the final roller in the heat treatment step. Namely, when the filament is wound up as a long fiber, the roller just before the winder is the last roller. In performing crimping for short-fiber applications, the roller located after the heat treatment and before the crimping is the last roller.

In general, in PPS fiber containing an oligomer, not only it is impossible to conduct stretching in a high stretch ratio of 3.5 or higher in terms of total stretch ratio, but also fluffing or filament breakage is apt to occur even in stretching in a low stretch ratio. However, we discovered that when the oligomer contained is a PPS oligomer as in the unstretched PPS fiber obtained from the PPS resin, high-ratio stretching is possible. Although the mechanism thereof has not been fully elucidated, we believe that the PPS oligomer is compatibilized with the PPS polymer and is hence finely dispersed to form no local defects which lead to breakage during stretching.

EXAMPLES

Our fibers and methods are explained below in more detail by reference to Examples. Properties in the Examples were determined by the following methods.

A. Weight-Average Molecular Weight

The weight-average molecular weights of a PPS polymer and a PPS fiber were determined using gel permeation chromatography (GPC), which is a kind of size exclusion chromatography (SEC), through calculation for polystyrene. Measurement conditions for the GPC are shown below.
Apparatus: SSC-7110, manufactured by Senshu Scientific Co., Ltd.
Column name: shodex UT-806M, manufactured by Showa Denko K.K.; two columns connected serially
Eluent: 1-chloronaphthalene
Detector: differential refractive-index detector
Column temperature: 210° C.
Pre-thermostatic chamber temperature: 250° C.
Pump thermostatic chamber temperature: 50° C.
Detector temperature: 210° C.
Flow rate: 1.0 mL/min
Sample injection amount: 300 µL (slurry; about 0.2% by weight)

B. Determination of PPS Oligomer Content in PPS Fiber

The PPS oligomer content in PPS fiber was calculated using high performance liquid chromatography (HPLC) by the following method.

About 10 mg of the PPS fiber were dissolved in about 5 g of 1-chloronaphthalene at 250° C. This solution was cooled to room temperature, upon which a sediment was formed. Using a membrane filter having a pore diameter of 0.45 µm, the 1-chloronaphthalene-insoluble components were filtrated off to obtain 1-chloronaphthalene-soluble components. The soluble components obtained were examined by HPLC to determine the amount of unreacted poly (arylene sulfide) cyclic compounds, and the conversion of poly(arylene sulfide) cyclic compounds into the poly (arylene sulfide) was calculated. Measurement conditions for the HPLC are shown below.
Apparatus: LC-10Avp Series, manufactured by Shimadzu Corp.
Column: Mightysil RP-18 GP150-4.6 (5 µm)
Detector: photodiode array detector (UV=270 nm)

C: Thermal Properties (Tc, ΔHc, Tm, ΔHm)

A differential scanning calorimeter (DCS2920, manufactured by TA Instruments) was used to conduct a differential scanning calorimetric measurement in nitrogen at a heating rate of 16° C./min. The temperature at which an exothermic peak was observed was taken as crystallization temperature (Tc), and the crystallization heat quantity at the Tc was expressed by ΔHc (J/g). The temperature which was not lower than 200° C. and at which an endothermic peak was observed was taken as melting point (Tm), and the melting heat quantity at the Tm was expressed by ΔHm (J/g).

D. Birefringence

Birefringence was determined by measuring the retardation of single fibers at a wavelength of 589 nm using a Na illuminant and polarization microscope BH-2, manufactured by Olympus Co., Ltd., by the compensator method and measuring the diameters of the fibers.

E. Overall Fineness, Single-Fiber Fineness

A hank of 100-m fibers was taken using a sizing reel, and the weight (g) thereof was increased 100-fold. This measurement was made three times for each level, and an average thereof was taken as the overall fineness (dtex). This overall fineness was divided by the number of filaments, and the resultant quotient was taken as the single-fiber fineness (dtex).

F. Strength, Elongation, Elastic Modulus

In accordance with the method described in JIS L 1013: 2010, a measurement was conducted 10 times for each level using Tensilon UCT-100, manufactured by Orientec Co., Ltd., under the conditions of a specimen length of 200 mm and a pulling speed of 200 mm/min. Average values thereof were taken as the force (cN), strength (cN/dtex), elongation (%), and elastic modulus (cN/dtex). The elastic modulus is initial resistance to stretching. Meanwhile, a heating oven was used to keep the measuring part at 120° C. and make the same measurement, and average values thereof were taken as the 120° C. force (cN), strength (cN/dtex), elongation (%), and elastic modulus (cN/dtex).

G. Loss Tangent (Tan δ)

Using Vibron DDV-II-EP, manufactured by Orientec Co., Ltd., a dynamic viscoelasticity measurement was made from 60° C. to 210° C. under the conditions of a frequency of 110 Hz, initial load of 0.13 cN/dtex, and heating rate of 3° C./min to determine a peak temperature of loss tangent (tan δ). When a peak top value continued over a certain temperature range, the average of these temperatures was taken as the peak temperature.

H. Degree of 160° C. Dry Heat Shrinkage

In accordance with the method described in JIS L 1013, a measurement was conducted in the following manner. A specimen was allowed to stand in an atmosphere of 20° C. and 65% RH, and the length of the fibers on which a load of ⅟₃₀ g/d (i.e., 0.033 g/d) was being imposed was then measured as the length of the untreated fibers. These fibers were heat-treated at 160° C. for 30 minutes, and the length of the treated fibers was measured under the same load as before the treatment. An average of three values calculated using the following expression was taken as the degree of 160° C. dry heat shrinkage.

[(Length of untreated fibers)−(length of treated fibers)]/(length of untreated fibers)×100

I. Evaluation of Filament Breakage in Spinning

Spinning was performed for 60 minutes. The level on which no filament breakage occurred is indicated by "good," the level on which single-filament breakage occurred is indicated by "fair," and the level on which not only single-filament breakage occurred but also all the filaments broke is indicated by "bad."

J. Evaluation of Filament Breakage in Stretching

Stretching was performed for 15 minutes. The level on which neither filament breakage nor single-filament winding occurred is indicated by "good," the level on which single-filament winding occurred is indicated by "fair," and the level on which filament breakage occurred is indicated by "bad."

K. U %

Using Uster Tester UT-4, manufactured by Zellweger Uster Ltd., U % was measured under the conditions of a filament length of 200 m and a filament speed of 100 m/min.

Reference Example 1

Production of PPS Oligomer

Into a 70-L autoclave equipped with a stirrer were introduced 8.27 kg (70.0 mol) of 47.5% sodium hydrosulfide, 2.96 kg (71.0 mol) of 96% sodium hydroxide, 11.44 kg (116 mol) of NMP, 1.72 kg (21.0 mol) of sodium acetate, and 10.5 kg of ion-exchanged water. The contents were gradually heated to about 240° C. over about 3 hours while passing nitrogen therethrough at ordinary pressure, and 14.8 kg of water and 280 g of NMP were discharged as a distillate via a rectifier. Thereafter, the reaction vessel was cooled to 160° C. During this liquid-removing operation, hydrogen sulfide was released from the system in an amount of 0.02 mol per mol of the sulfur ingredient introduced.

Next, 10.3 kg (70.3 mol) of p-dichlorobenzene and 9.00 kg (91.0 mol) of NMP were added, and the reaction vessel was closed in a nitrogen gas atmosphere. While stirring the contents at 240 rpm, the contents were heated to 270° C. at a rate of 0.6° C./min and held at this temperature for 140 minutes. The contents were cooled to 250° C. at a rate of 1.3° C./min, while forcing 1.26 kg (70 mol) of water into the reaction vessel over 15 minutes. Thereafter, the contents were cooled to 220° C. at a rate of 0.4° C./min and then rapidly cooled to about room temperature, thereby obtaining a slurry (A). This slurry (A) was diluted with 26.3 kg of NMP to obtain a slurry (B).

A 1,000-g portion of the slurry (B) heated at 80° C. was filtered with a sieve (80 mesh; opening size, 0.175 mm) to obtain a crude PPS resin and about 750 g of a slurry (C). The slurry (C) was introduced into a rotary evaporator and, after nitrogen replacement, treated at 100-160° C. for 1.5 hours at a reduced pressure. Thereafter, the residue was treated with a vacuum dryer at 160° C. for 1 hour. The content of NMP in the solid obtained was 3% by weight.

To this solid was added 900 g (1.2 times the amount of the slurry (C)) of ion-exchanged water. Thereafter, the mixture was stirred at 70° C. for 30 minutes to obtain a slurry again. This slurry was suction-filtered with a glass filter having an opening size of 10-16 μm. To the resultant white cake was added 900 g of ion-exchanged water. This mixture was stirred at 70° C. for 30 minutes to obtain a slurry again. This slurry was suction-filtered in the same manner, and the resultant cake was vacuum-dried at 70° C. for 5 hours to obtain a PPS oligomer.

A 4-g portion was taken out from the PPS oligomer obtained, and subjected to 3-hour Soxhlet extraction with 120 g of chloroform. The chloroform was distilled off from the resultant extract. Twenty grams of chloroform was added again to the solid obtained, and the solid was dissolved at room temperature to obtain a slurry mixture. This slurry mixture was gradually added dropwise to 250 g of methanol with stirring, and the resultant sediment was taken out by suction filtration with a glass filter having an opening size of 10-16 μm. The white cake obtained was vacuum-dried at 70° C. for 3 hours to obtain a white powder.

The white powder had a weight-average molecular weight of 900. The white powder was burned with an electric furnace or the like and the residual ash was analyzed by ion chromatography. As a result, the Na content and the chlorine content were found to be 4 ppm and 2.0 wt %, respectively, and the content of any alkali metal other than Na and the content of any halogen other than chlorine were below the detection limit. An absorption spectrum obtained by infrared spectroscopic analysis of the white powder revealed that the white powder was PPS. Moreover, a differential scanning calorimeter was used to analyze the thermal properties of the white powder. As a result (heating rate, 40° C./min), we found that the white powder showed a broad endothermic peak at about 200-260° C. and the peak temperature was about 215° C.

Furthermore, from the results of mass spectral analysis of components obtained by fractionation by high performance liquid chromatography and from information on molecular weight from MALDI-TOF-MS, the white powder was found to be a mixture including a PPS cyclic oligomer in which the number of repeating units was 4-11 and a linear PPS in which the number of repeating units was 2-11, the weight ratio of the PPS cyclic oligomer to the linear PPS being about 9:1. Thus, the white powder obtained was found to be PPS oligomers including about 90% by weight PPS cyclic oligomer and about 10% by weight linear PPS.

Reference Example 2

Production of PPS Polymer (A)

About 50 L of NMP was added to 20 kg of the crude PPS resin obtained in Reference Example 1, and the crude PPS resin was washed at 85° C. for 30 minutes and taken out by filtration with a sieve (80 mesh; opening size, 0.175 mm). The solid obtained was diluted with 50 L of ion-exchanged water and the resultant mixture stirred at 70° C. for 30 minutes and then filtered with a 80-mesh sieve to recover the solid. This operation was repeatedly performed five times in total. The solid thus obtained was dried with 130° C. hot air to obtain a dried PPS polymer (A).

Reference Example 3

Production of PPS Polymer (B)

The PPS oligomers obtained in Reference Example 1, which included a PPS cyclic oligomer, were introduced into an autoclave equipped a stirrer. The atmosphere was replaced with nitrogen, and the autoclave heated to 340° C. over 1 hour. When the PPS oligomers melted during the temperature rising, the stirrer was started, and the melting and heating performed for 180 minutes while stirring the contents at a stirrer rotation speed of 10 rpm. Thereafter, a polymer was taken out, in the shape of a gut, by nitrogen pressure through the discharge hole, and the gut was pelletized. The solid thus obtained was dried with 130° C. hot air to obtain a dried PPS polymer (B).

Reference Example 4

Production of PPS Polymer (C)

A PPS polymer (C) was obtained in the same manner as in Reference Example 3, except that use was made of PPS oligomers which had been obtained by purifying the PPS oligomers including a PPS cyclic oligomer and obtained in Reference Example 1 and which included about 95% by weight PPS cyclic oligomer and about 5% by weight linear PPS.

Reference Example 5

Production of PPS Polymer (D)

A PPS polymer (D) was obtained in the same manner as in Reference Example 3, except that use was made of PPS oligomers which had been obtained by adding a linear PPS oligomer to the PPS oligomers including a PPS cyclic oligomer and obtained in Reference Example 1 and which included about 80% by weight PPS cyclic oligomer and about 20% by weight linear PPS.

Example 1

In Examples 1 to 5 and Comparative Examples 1 to 3, influences of the total PPS oligomer contents and contents of a PPS cyclic oligomer in polymers on the physical properties and other properties of the fibers were evaluated.

A polymer obtained by kneading the PPS polymer (A) obtained in Reference Example 2 together with the PPS oligomers obtained in Reference Example 1 added thereto in an amount of 5.0% by weight based on the weight of the PPS polymer, using twin-screw extruder KZW, manufactured by TECHNOVEL Corp., was vacuum-dried at 150° C. for 10 hours. Thereafter, the polymer was melt-extruded with the twin-screw extruder KZW, manufactured by TECHNOVEL Corp., and the resultant polymer was fed to a spinning pack while being metered with a gear pump. In the spinning pack, the polymer was filtered with a metallic nonwoven fabric filter. The polymer filtered was ejected from a spinneret having 36 holes having a diameter D of 0.23 mm and a land length L of 0.30 mm, under the conditions of 18 g/min. The introduction hole located right above each spinneret hole was a straight hole, and the joint between the introduction hole and the spinneret hole was tapered. The polymer ejected was passed through a 40-mm heat insulation zone and then solidified by cooling from outside the filaments with a 25° C. air stream. Thereafter, a spinning oil including a fatty acid ester compound as a main component was applied thereto, and all the filaments were taken up by a first godet roll at a spinning speed of 600 m/min. These filaments were wound up with a winder via a second godet roll having the same speed as the first godet roll. Thus, unstretched filaments were obtained.

The unstretched filaments were taken up by a feed roller (FR) equipped with nip rollers, and a tension applied to the unstretched filaments between the feed roller and a first roller (1HR) (peripheral-speed ratio between FR and 1HR being 1.01). Thereafter, the filaments were made to make six laps around each of the first roller heated at 100° C. and a second roller (2HR) heated at 110° C., thereby stretching the filaments in a stretch ratio of 3.8. The filaments which had passed the second roller were made to make six laps around a third roller (3HR) heated at 230° C., thereby performing heat setting. The third roller had a peripheral speed of 400 m/min, and the peripheral-speed ratio of the third roller to the second roller was 0.95. The fibers which had passed the third roller were taken up by a non-heated roller having the same speed as the third roller and wound up with a winder.

In the spinning and stretching steps, especially no filament breakage occurred, and fibers having no fluffs were able to be obtained. The fibers were examined for weight-average molecular weight using GPC and, as a result, a peak assigned to oligomers was able to be observed besides a peak assigned to a polymer. Namely, two peaks were observed.

Comparative Example 1

Spinning and stretching were conducted in the same manner as in Example 1, except that the PPS polymer (A) obtained in Reference Example 2 was used and this polymer was vacuum-dried at 150° C. for 10 hours, subsequently melt-extruded with twin-screw extruder KZW, manufactured by TECHNOVEL Corp., and fed to the spinning pack while being metered with a gear pump.

In the spinning and stretching steps, especially no filament breakage occurred, and fibers having no fluffs were able to be obtained. Since the PPS fibers had a PPS oligomer content of less than 1% by weight, the value of tan δ was high as compared to that of Example 1, showing that the PPS fibers of Comparative Example 1 had poor thermal shapability. These fibers were examined for weight-average molecular weight using GPC and, as a result, only a peak assigned to a polymer was observed.

Example 2

Spinning and stretching were conducted in the same manner as in Example 1, except that the PPS polymer (B) obtained in Reference Example 3 was used.

In the spinning and stretching steps, especially no filament breakage occurred, and fibers having no fluffs were able to be obtained. These fibers were examined for weight-average molecular weight using GPC. As a result, a peak assigned to oligomers was able to be observed besides a peak assigned to a polymer. Namely, two peaks were observed.

Example 3

Spinning and stretching were conducted in the same manner as in Example 1, except that use was made of a polymer obtained by kneading the PPS polymer (B) obtained in Reference Example 3 together with the PPS oligomers obtained in Reference Example 1 added thereto in an amount of 7.0% by weight based on the weight of the PPS polymer, using twin-screw extruder KZW, manufactured by TECHNOVEL Corp.

In the spinning and stretching steps, especially no filament breakage occurred, and fibers having no fluffs were able to be obtained. These fibers were examined for weight-average molecular weight using GPC. As a result, a peak assigned to oligomers was able to be observed besides a peak assigned to a polymer. Namely, two peaks were observed.

Example 4

Spinning and stretching were conducted in the same manner as in Example 1, except that the PPS polymer (C) obtained in Reference Example 4 was used.

In the spinning and stretching steps, especially no filament breakage occurred, and fibers having no fluffs were able to be obtained. These fibers were examined for weight-average molecular weight using GPC. As a result, a peak assigned to oligomers was able to be observed besides a peak assigned to a polymer. Namely, two peaks were observed.

Example 5

Spinning and stretching were conducted in the same manner as in Example 1, except that the PPS polymer (D) obtained in Reference Example 5 was used.

In the spinning and stretching steps, especially no filament breakage occurred, and fibers having no fluffs were able to be obtained. These fibers were examined for weight-average molecular weight using GPC. As a result, a peak assigned to oligomers was able to be observed besides a peak assigned to a polymer. Namely, two peaks were observed.

Comparative Example 2

Spinning and stretching were conducted in the same manner as in Example 1, except that use was made of a polymer obtained by kneading the PPS polymer (B) obtained in Reference Example 3 together with the PPS oligomers obtained in Reference Example 1 added thereto in an amount of 10.0% by weight based on the weight of the PPS polymer, using twin-screw extruder KZW, manufactured by TECHNOVEL Corp.

In the spinning and stretching steps, especially no filament breakage occurred, and fibers having no fluffs were able to be obtained. Since the PPS fibers had a PPS oligomer content exceeding 10% by weight, the strength thereof was less than 3.0 cN/dtex. Fibers having the desired strength and elongation properties were unable to be obtained. The fibers obtained were examined for weight-average molecular weight using GPC. As a result, a peak assigned to oligomers was able to be observed besides a peak assigned to a polymer. Namely, two peaks were observed.

Comparative Example 3

Unstretched filaments obtained by the method described in Example 2 were taken up by a feed roller equipped with nip rollers, and a tension was applied to the unstretched filaments between the feed roller and a first roller. Thereafter, the filaments were made to make six laps around each of the first roller heated at 100° C. and a second roller heated at 110° C., thereby stretching the filaments in a stretch ratio of 2.5. The filaments which had passed the second roller were taken up by a non-heated roller having the same speed as the second roller and wound up with a winder.

In the spinning and stretching steps, especially no filament breakage occurred, and fibers having no fluffs were able to be obtained. Meanwhile, the fibers had a value of $\Delta Hm-\Delta Hc$ of less than 25 J/g, a strength of less than 3.0 cN/dtex, and an elongation of 40% or higher. Fibers having the desired properties were unable to be obtained. The fibers obtained were examined for weight-average molecular weight using GPC. As a result, a peak assigned to oligomers was able to be observed besides a peak assigned to a polymer. Namely, two peaks were observed.

The properties of the PPS fibers of the Examples 1 to 5 and Comparative Examples 1 to 3 are shown in Table 1.

TABLE 1

|  | Example 1 | Comparative Example 1 | Example 2 | Example 3 | Example 4 | Example 5 | Comparative Example 2 | Comparative Example 3 |
|---|---|---|---|---|---|---|---|---|
| Polymer | A | A | B | B | C | D | B | B |
| Weight-average molecular weight, Mw | 50,000 | 50,000 | 49,000 | 49,000 | 83,000 | 32,000 | 49,000 | 49,000 |
| PPS oligomers | mixed | not mixed | not mixed | mixed | not mixed | not mixed | mixed | not mixed |
| Total PPS oligomer content (wt %) | 5.8 | 0.8 | 2.3 | 9.0 | 8.3 | 1.2 | 12.0 | 2.3 |
| Content of PPS cyclic oligomer (wt %) | 5.0 | 0.5 | 2.3 | 8.3 | 8.3 | 1.2 | 11.0 | 2.3 |
| Content of linear PPS oligomer (wt %) | 0.8 | 0.3 | 0.0 | 0.7 | 0.0 | 0.0 | 1.0 | 0.0 |
| Single-fiber fineness (dtex) | 2.3 | 2.3 | 2.3 | 2.3 | 2.3 | 2.3 | 2.3 | 3.5 |
| Strength (cN/dtex) | 3.98 | 4.21 | 4.10 | 3.68 | 4.62 | 3.21 | 2.95 | 2.79 |
| Elongation (%) | 26.2 | 24.8 | 25.7 | 26.0 | 27.9 | 23.2 | 29.8 | 48.2 |
| Elastic modulus (cN/dtex) | 51.0 | 50.8 | 51.7 | 50.2 | 53.0 | 50.7 | 46.1 | 32.1 |
| Tc (° C.) | 110 | 111 | 111 | 112 | 111 | 111 | 115 | 111 |
| Tm (° C.) | 284 | 285 | 284 | 283 | 284 | 284 | 283 | 284 |
| $\Delta Hm - \Delta Hc$ (J/g) | 39.2 | 40.0 | 41.7 | 40.8 | 42.1 | 41.8 | 37.4 | 22.5 |

TABLE 1-continued

|  | Example 1 | Comparative Example 1 | Example 2 | Example 3 | Example 4 | Example 5 | Comparative Example 2 | Comparative Example 3 |
|---|---|---|---|---|---|---|---|---|
| Birefringence, Δn | 0.274 | 0.280 | 0.273 | 0.263 | 0.272 | 0.279 | 0.243 | 0.194 |
| tanδ peak temperature (° C.) | 152 | 162 | 155 | 153 | 154 | 155 | 150 | 147 |
| Degree of 160° C. dry heat shrinkage (%) | 4.5 | 4.8 | 4.2 | 4.5 | 3.7 | 4.2 | 4.4 | 8.5 |

Example 6

In Examples 6 to 11 and Comparative Examples 4 and 5, PPS polymers containing PPS oligomers were evaluated with respect to a relationship between fiber formation conditions for the polymers and the suitability thereof for fiber formation.

The PPS polymer (B) obtained in Reference Example 3 was used, and this polymer was vacuum-dried at 150° C. for 10 hours and then melt-extruded with twin-screw extruder KZW, manufactured by TECHNOVEL Corp. The resultant resin was fed to a spinning pack while being metered with a gear pump. In the spinning pack, the polymer was filtered with a metallic nonwoven fabric filter. The polymer filtered was ejected from a spinneret having 36 holes having a diameter D of 0.23 mm and a land length L of 0.30 mm, under the conditions of 18 g/min. The introduction hole located right above each spinneret hole was a straight hole, and the joint between the introduction hole and the spinneret hole was tapered. The polymer ejected was passed through a 40-mm heat insulation zone and then solidified by cooling from outside the filaments with a 25° C. air stream. Thereafter, a spinning oil including a fatty acid ester compound as a main component was applied thereto, and the filaments were taken up under the conditions shown in Table 2 and were then wound up with a winder.

The unstretched filaments obtained were taken up by a feed roller equipped with nip rollers, and a tension was applied to the unstretched filaments between the feed roller and a first roller. Thereafter, the filaments were made to make six laps around each of the first roller heated at 100° C. and a second roller heated at 110° C., thereby stretching the filaments. The filaments which had passed the second roller were made to make six laps around a heated third roller to perform heat setting. The third roller had a peripheral speed of 400 m/min. The fibers which had passed the third roller were taken up by a non-heated roller having the same peripheral speed as the third roller and wound up with a winder.

In each step, no filament breakage occurred and the filaments showed satisfactory processability. The mechanical properties and fiber diameter evenness of the fibers obtained were also satisfactory.

Example 7

Spinning and stretching were conducted in the same manner as in Example 6, except that the PPS polymer (C) obtained in Reference Example 4 was used.

In each step, no filament breakage occurred and the filaments showed satisfactory processability. The mechanical properties and fiber diameter evenness of the fibers obtained were also satisfactory.

Example 8

Spinning and stretching were conducted in the same manner as in Example 6, except that the PPS polymer (D) obtained in Reference Example 5 was used.

In each step, no filament breakage occurred and the filaments showed satisfactory processability. The mechanical properties and fiber diameter evenness of the fibers obtained were also satisfactory.

Example 9 and Comparative Example 4

Spinning and stretching were conducted in the same manner as in Example 6, except that use was made of polymers obtained by kneading the PPS polymer (B) obtained in Reference Example 3 together with the PPS oligomers obtained in Reference Example 1, using twin-screw extruder KZW, manufactured by TECHNOVEL Corp.

In Example 9, in which the PPS oligomer content was 10% by weight or less, no filament breakage occurred in each step and the filaments showed satisfactory processability. The mechanical properties and fiber diameter evenness of the fibers obtained in Example 9 were also satisfactory. Meanwhile, with respect to Comparative Example 4, in which the PPS oligomer content exceeded 10% by weight, filament breakage occurred during the spinning and stretching, and the fibers obtained had poor evenness in fiber diameter.

Example 10

Spinning and stretching were conducted in the same manner as in Example 6, except that use was made of a polymer obtained by kneading the PPS polymer (B) obtained in Reference Example 3 together with a linear PPS oligomer having a weight-average molecular weight of about 1,000 added thereto, using twin-screw extruder KZW, manufactured by TECHNOVEL Corp., and that the stretch ratio was changed.

Since the total stretch ratio was regulated to 3.80, no filament breakage occurred in each step and the filaments showed satisfactory processability. The mechanical properties and fiber diameter evenness of the fibers obtained were also satisfactory.

The step conditions in Examples 6 to 10 and Comparative Example 4 and the property values are shown in Table 2.

TABLE 2

|  |  | Example 6 | Example 7 | Example 8 | Example 9 | Comparative Example 4 | Example 10 |
|---|---|---|---|---|---|---|---|
| Polymer | Polymer | B | C | D | B | B | B |
|  | Weight-average molecular weight, Mw | 49000 | 83000 | 32000 | 49000 | 49000 | 49000 |

TABLE 2-continued

|  |  | Example 6 | Example 7 | Example 8 | Example 9 | Comparative Example 4 | Example 10 |
|---|---|---|---|---|---|---|---|
|  | PPS oligomers | not mixed | not mixed | not mixed | mixed | mixed | mixed |
|  | Total PPS oligomer content (wt %) | 2.3 | 8.3 | 1.2 | 9.0 | 12.0 | 5.1 |
|  | Content of PPS cyclic oligomer (wt %) | 2.3 | 8.3 | 1.2 | 8.3 | 11.0 | 2.3 |
|  | Content of linear PPS oligomer (wt %) | 0.0 | 0.0 | 0.0 | 0.7 | 1.0 | 2.8 |
| Spinning | Collection length (mm) | 2000 | 2000 | 2000 | 2000 | 2000 | 2000 |
|  | Take-up speed (m/min) | 600 | 600 | 600 | 600 | 600 | 600 |
|  | Filament breakage | good | good | good | good | fair | good |
| Stretching | Heat treatment temperature (° C.) | 230 | 230 | 230 | 230 | 230 | 230 |
|  | Stretch ratio between FR and 1HR | 1.01 | 1.01 | 1.01 | 1.01 | 1.01 | 1.01 |
|  | Stretch ratio between 1HR and 2HR | 4.1 | 4.1 | 4.1 | 4.1 | 4.1 | 3.8 |
|  | Stretch ratio between 2HR and 3HR | 0.99 | 0.99 | 0.99 | 0.99 | 0.99 | 0.99 |
|  | Total stretch ratio | 4.1 | 4.1 | 4.1 | 4.1 | 4.1 | 3.8 |
|  | Filament breakage | good | good | good | good | bad | good |
| Physical Properties | Single-fiber fineness (dtex) | 2 | 2 | 2 | 2 | 2 | 2.2 |
|  | Strength (cN/dtex) | 4.02 | 4.76 | 3.75 | 3.98 | 3.76 | 3.64 |
|  | Elongation (%) | 25.4 | 22.1 | 25.8 | 26.5 | 28 | 24.5 |
|  | Degree of 160° C. dry heat shrinkage (%) | 4.5 | 4.8 | 4.4 | 4.5 | 4.8 | 4.6 |
|  | U % (%) | 0.82 | 0.91 | 0.76 | 0.98 | 1.42 | 1.13 |

Comparative Example 5

Spinning and stretching were conducted in the same manner as in Example 6, except that the PPS polymer (A) obtained in Reference Example 2 was used.

In each step, no filament breakage occurred and the filaments showed satisfactory processability. The mechanical properties and fiber diameter evenness of the fibers obtained were also satisfactory. However, the fibers obtained show poor thermal shapability because of the too low PPS oligomer content.

Example 11

Spinning and stretching were conducted in the same manner as in Example 6, except that use was made of a polymer obtained by kneading the PPS polymer (A) obtained in Reference Example 2 together with the PPS oligomers obtained in Reference Example 1 added thereto, using twin-screw extruder KZW, manufactured by TECH-NOVEL Corp.

In each step, no filament breakage occurred and the filaments showed satisfactory processability. The mechanical properties and fiber diameter evenness of the fibers obtained were also satisfactory.

The step conditions in Comparative Example 5 and Example 11 and the property values are shown in Table 3.

Examples 12 and 13

In Examples 12 and 13, an influence of collection length in spinning was evaluated.

Spinning and stretching were conducted in the same manner as in Example 6, except that the collection length in the spinning step was changed.

In Examples 12 and 13, in which the collection lengths were respectively within 5,000 mm and 1,000 mm from the cooling initiation position, no filament breakage occurred in each step and the filaments showed satisfactory processability. The mechanical properties and fiber diameter evenness of the fibers obtained were also satisfactory.

Example 14 and Comparative Examples 6 and 7

In Example 14 and Comparative Examples 6 and 7, an influence of take-up speed in spinning was evaluated.

Spinning was conducted in the same manner as in Example 6, except that the take-up speed in the spinning step was changed. Furthermore, stretching was conducted in the same manner as in Example 6, except that the total stretch ratio was changed.

In Example 14, in which the take-up speed was 1,500 m/min or less, no filament breakage occurred in each step

TABLE 3

|  |  | Comparative Example 5 | Example 11 |
|---|---|---|---|
| Polymer | Weight-average molecular weight, Mw | 50000 | 50000 |
|  | Total PPS oligomer content (wt %) | 0.8 | 5.8 |
|  | Content of PPS cyclic oligomer (wt %) | 0.5 | 5.0 |
|  | Content of linear PPS oligomer (wt %) | 0.3 | 0.8 |
| Spinning | Collection length (mm) | 2000 | 2000 |
|  | Take-up speed (m/min) | 600 | 600 |
|  | Filament breakage | good | good |
| Stretching | Heat treatment temperature (° C.) | 230 | 230 |
|  | Stretch ratio between FR and 1HR | 1.01 | 1.01 |
|  | Stretch ratio between 1HR and 2HR | 4.1 | 4.1 |
|  | Stretch ratio between 2HR and 3HR | 0.99 | 0.99 |
|  | Total stretch ratio | 4.1 | 4.1 |
|  | Filament breakage | good | good |
| Physical Properties | Single-fiber fineness (dtex) | 2 | 2 |
|  | Strength (cN/dtex) | 4.22 | 3.85 |
|  | Elongation (%) | 24.6 | 27.6 |
|  | Degree of 160° C. dry heat shrinkage (%) | 4 | 4.5 |
|  | U % (%) | 0.85 | 0.92 | and the filaments showed satisfactory processability. The mechanical properties and fiber diameter evenness of the fibers obtained were also satisfactory. In Comparative Example 6, in which the take-up speed was less than 500 m/min, the value of U % was high and the fiber diameter evenness was poor, although the filaments showed satisfactory processability. In Comparative Example 7, in which the take-up speed exceeded 1,500 m/min, spun-filament breakage occurred frequently and, hence, unstretched fibers were unable to be obtained.

The step conditions in Examples 12 to 14 and Comparative Examples 6 and 7 and the property values are shown in Table 4.

TABLE 4

| | | Example 12 | Example 13 | Example 14 | Comparative Example 6 | Comparative Example 7 |
|---|---|---|---|---|---|---|
| Spinning | Collection length (mm) | 5000 | 1000 | 2000 | 2000 | 2000 |
| | Take-up speed (m/min) | 600 | 600 | 1500 | 400 | 2000 |
| | Filament breakage | good | good | good | good | bad |
| Stretching | Heat treatment temperature (° C.) | 230 | 230 | 230 | 230 | — |
| | Stretch ratio between FR and 1HR | 1.01 | 1.01 | 1.01 | 1.01 | |
| | Stretch ratio between 1HR and 2HR | 4.1 | 4.1 | 3.6 | 4.4 | |
| | Stretch ratio between 2HR and 3HR | 0.99 | 0.99 | 0.99 | 0.99 | |
| | Total stretch ratio | 4.1 | 4.1 | 3.6 | 4.4 | |
| | Filament breakage | good | good | good | good | |
| Physical Properties | Single-fiber fineness (dtex) | 2 | 2 | 1 | 2.8 | — |
| | Strength (cN/dtex) | 4.1 | 4 | 4.58 | 3.89 | |
| | Elongation (%) | 25.3 | 25.4 | 20.2 | 25.2 | |
| | Degree of 160° C. dry heat shrinkage (%) | 4.3 | 4.2 | 4.8 | 5.1 | |
| | U % (%) | 0.84 | 0.92 | 0.88 | 1.53 | |

Example 15 and Comparative Example 8

In Example 15 and Comparative Examples 8 and 9, the influence of stretching conditions was evaluated.

Spinning and stretching were conducted in the same manner as in Example 6, except that the total stretch ratio was changed.

In Example 15, in which the total stretch ratio was 3.5 or higher, no filament breakage occurred in each step and the filaments showed satisfactory processability. The mechanical properties and fiber diameter evenness of the fibers obtained in Example 15 were also satisfactory. Meanwhile, in Comparative Example 8, in which the total stretch ratio was less than 3.5, filament breakage occurred during the stretching, and the fibers obtained had poor fiber diameter evenness.

Comparative Example 9

Spinning and stretching were conducted in the same manner as in Example 6, except that no heat treatment was performed during the stretching.

No filament breakage occurred in each step, and the filaments showed satisfactory processability. However, the fibers obtained had a high degree of 160° C. dry heat shrinkage and were not fibers capable of withstanding practical use.

The step conditions in Example 15 and Comparative Examples 8 and 9 and the property values are shown in Table 5.

TABLE 5

| | | Example 15 | Comparative Example 8 | Comparative Example 9 |
|---|---|---|---|---|
| Stretching | Heat treatment temperature (° C.) | 230 | 230 | — |
| | Stretch ratio between FR and 1HR | 1.01 | 1.01 | 1.01 |
| | Stretch ratio between 1HR and 2HR | 3.5 | 3.2 | 4.1 |
| | Stretch ratio between 2HR and 3HR | 0.99 | 0.99 | 0.99 |
| | Total stretch ratio | 3.5 | 3.2 | 4.1 |
| | Filament breakage | good | bad | good |

TABLE 5-continued

|  |  | Example 15 | Comparative Example 8 | Comparative Example 9 |
|---|---|---|---|---|
| Physical Properties | Single-fiber fineness (dtex) | 2.4 | 2 | 2 |
|  | Strength (cN/dtex) | 3.12 | 2.62 | 2.54 |
|  | Elongation (%) | 33.6 | 40.8 | 28.6 |
|  | Degree of 160° C. dry heat shrinkage (%) | 3.3 | 3 | 35.7 |
|  | U % (%) | 0.94 | 2.86 | 0.99 |

INDUSTRIAL APPLICABILITY

The PPS fiber has high heat resistance, chemical resistance, electrical insulating properties, mechanical properties, and flame retardancy and excellent thermal shapability. The PPS fiber is hence suitable for use in various applications to take advantage of these features, the applications including filter applications such as bag filters, filters for liquid chemicals, filters for foods, chemical filters, oil filters, engine oil filters, and air-cleaning filters, paper applications such as electrically insulating paper, heat-resistant working wear applications such as firefighting garments, and other applications including safety garments, working wear for experiments, heat insulating garments, flame-retardant garments, felts for papermaking, sewing yarns, heat-resistant felts, release materials, dryer canvases for papermaking, separators for cells, separators for electrodes, heart patches, artificial blood vessels, artificial skins, substrates for printed wiring boards, copy rolling cleaners, ion-exchange bases, oil-holding materials, heat insulators, cushioning materials, brushes, net conveyors, motor binding threads, and motor binder tapes. In particular, the PPS fiber can be advantageously used as bag filters, electrically insulating paper, and motor binding threads. However, applications of the PPS fiber are not limited to these examples.

The invention claimed is:

1. A poly(phenylene sulfide) fiber containing 1-10% by weight of a poly(phenylene sulfide) oligomer having a weight-average molecular weight of 5,000 or less, having a difference between a cold crystallization heat quantity (ΔHc) and a crystal melting heat quantity (ΔHm) during temperature rising in DSC, ΔHm−ΔHc, of 25 J/g or larger, and having an elongation of less than 40% and a strength of 3.0 cN/dtex or higher.

2. The poly(phenylene sulfide) fiber according to claim 1, wherein the poly(phenylene sulfide) oligomer is a cyclic oligomer.

* * * * *